E. ALLEN.
CHILD'S VEHICLE.
APPLICATION FILED APR. 4, 1919.

1,395,660.

Patented Nov. 1, 1921.

Inventor
Eric Allen

UNITED STATES PATENT OFFICE.

ERIC ALLEN, OF BETHEL, CONNECTICUT.

CHILD'S VEHICLE.

1,395,660.  Specification of Letters Patent.  Patented Nov. 1, 1921.

Application filed April 4, 1919. Serial No. 287,647.

*To all whom it may concern:*

Be it known that I, ERIC ALLEN, a citizen of the United States, and a resident of Bethel, in the county of Fairfield and State of Connecticut, (whose post-office address is Bethel, Connecticut,) have invented a new and useful Child's Vehicle of Automobile Type.

My invention relates to improvements in four-wheeled child's vehicles of automobile type in which the steering device suggests in appearance and function that of an automobile; and the objects of my improvement are: first, to provide a steering post not identical with the king bolt operating directly in contact with the front axle rod and projecting up through a bearing in the body-board at an angle other than a right angle, which suggests in appearance and function the steering device of an automobile; second, to provide a steering post that is retained in place, with respect to the other parts of the vehicle, without any other attachments than the bearing on the front axle, a semi-circular cut-out in the front axle bed and the bearing in the body-board; and, third, to reduce the number of parts, joints, and attachments and the friction involved in similar devices now known and used.

Figure 1:
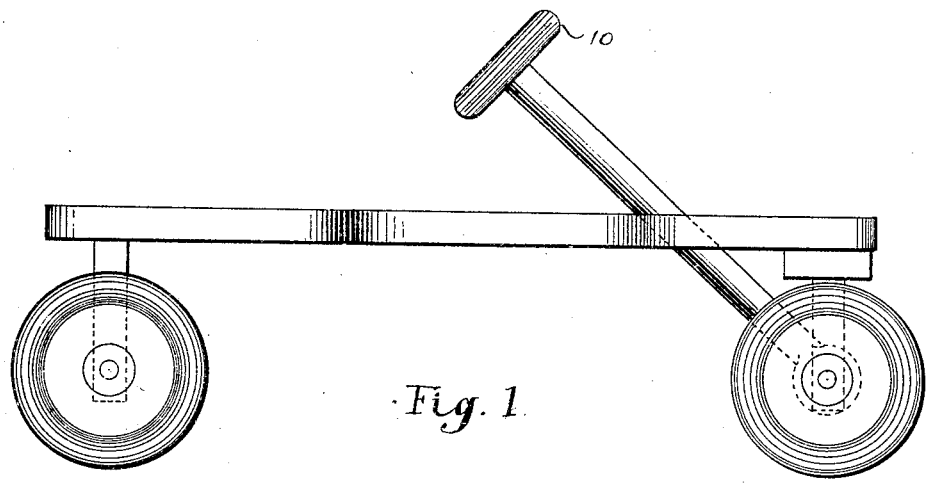
Figures 2, 6:
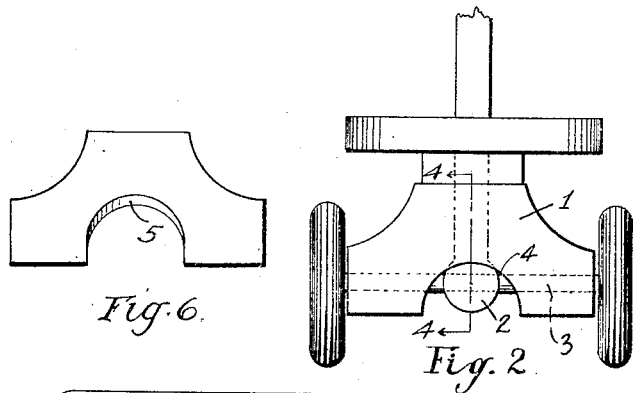
Figure 3:
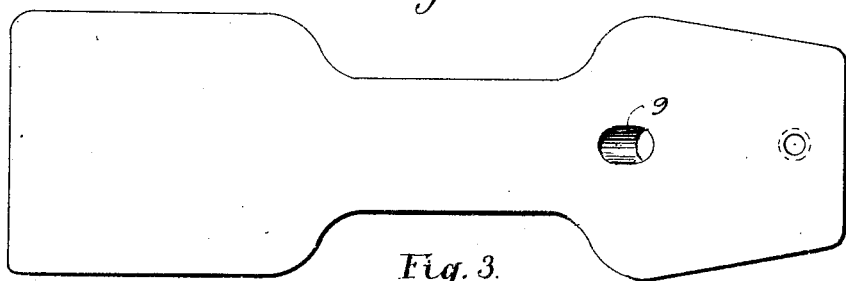
Figure 4:
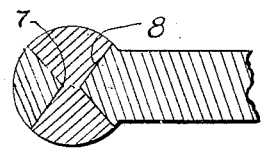
Figure 5:

I attain these objects by the mechanism illustrated in the accompanying drawing, in which:

Figure 1 is a side view of the machine; Fig. 2 is a front view of the machine; Fig. 3 is a plan view of the body-board; Fig. 4 is a sectional view of the steering post head; Fig. 5 is a plan view of the steering post; Fig. 6 is a rear view of the front axle bed.

The structure of the machine (Fig. 1), with the exception of the steering device, is similar to that of other four-wheeled vehicles now known and used, in which the front axle bed turns on the king bolt, and the rear axle bed is stationary, with respect to the body-board.

The front axle bed 1 (Fig. 2) is constructed to retain the central point of the steering post head 2 indentical with the central point of the front axle rod 3 on a straight line projected through the center of the king bolt. The semi-circular cut-out 4 in which the steering post head plays is beveled at 5 on the rear edge to the center of the bearing retaining the axle rod, to permit the axle rod to turn from a right to an acute angle to either side with respect to the steering post.

The steering post 6 (Fig. 5) has a spherical head through which centrally is cut an X-shaped slot 8 (Fig. 4), which is gaged as a bearing for the front axle rod. The axle rod bearing in the slot, plays on its central point 7, which is identical with the central point of the steering post head, to either side to an acute angle with respect to the steering post. The steering post projects through a bearing 9 in the body-board (Fig. 3), and is manipulated by means of a handle or steering wheel 10. The steering post is retained in place with respect to the other parts of the vehicle by means of the semi-circular cut-out in the front axle bed, the front axle rod, and the bearing in the body-board, without the medium of any other attachments.

The machine is operated as a nursery, park, or sidewalk toy, by a child sitting astride the body-board, and may be propelled by traction, through the medium of any suitable device, by coasting, or by means of the feet in contact with the surface on which the running wheels rest, after the manner of similar vehicles now known and used, and may be steered directly or to either side by means of the steering device herein described.

I am aware that prior to my invention child's vehicles which suggest in appearance and function an automobile have been made. I, therefore, do not claim such a combination broadly; but

I claim:

The combination in a four-wheeled child's vehicle, of a body board, a bearing in the body board, a front axle bed, a semi-circular cut-out in the axle bed, a front axle rod carried by the axle-bed, a steering rod, a steering wheel on the steering rod, a spherical head on the steering rod, an X-shaped slot in the spherical head, said slot being gaged to operate as a bearing in conjunction with the front axle rod, and said steering post being retained in place with respect to the other parts of the vehicle by the spherical head on the front axle rod, the semi-circular cut-out in the front axle bed, and the bearing in the body board, without the medium of other attachments, and operated as a steering device when manipulated through the medium of the steering wheel, all substantially as set forth.

ERIC ALLEN.